United States Patent
Kakimoto et al.

(10) Patent No.: US 7,679,232 B2
(45) Date of Patent: Mar. 16, 2010

(54) ROTARY ELECTRIC MACHINE

(75) Inventors: Tadaaki Kakimoto, Hitachi (JP); Hiroyuki Mae, Mito (JP); Keiji Fugane, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 267 days.

(21) Appl. No.: 12/019,419

(22) Filed: Jan. 24, 2008

(65) Prior Publication Data

US 2008/0203832 A1    Aug. 28, 2008

(30) Foreign Application Priority Data

Feb. 28, 2007    (JP) .............................. 2007-048376

(51) Int. Cl.
*H02K 5/24*    (2006.01)
*H02K 5/02*    (2006.01)

(52) U.S. Cl. ........................................ 310/51; 181/202
(58) Field of Classification Search ................... 310/51; 181/202

See application file for complete search history.

(56) References Cited

U.S. PATENT DOCUMENTS

| | | | |
|---|---|---|---|
| 2,110,701 A * | 3/1938 | Farmer ...................... 248/610 |
| 3,125,736 A * | 3/1964 | Aronson ...................... 336/100 |
| 3,980,912 A | 9/1976 | Panza | |
| 4,007,388 A | 2/1977 | Lawyer et al. | |
| 4,469,973 A * | 9/1984 | Guyot et al. ................. 310/433 |
| 5,026,476 A * | 6/1991 | Ishimoto et al. ............... 210/89 |
| 5,266,856 A * | 11/1993 | Holter .......................... 310/51 |
| 6,329,730 B1 * | 12/2001 | Neckermann et al. ......... 310/51 |

FOREIGN PATENT DOCUMENTS

| | | | |
|---|---|---|---|
| EP | 438617 A1 * | 7/1991 |
| JP | 58-99241  * | 6/1983 |
| JP | 63-217946 A * | 9/1988 |
| JP | 5-219683 | 8/1993 |
| JP | 11-252850 | 9/1999 |

* cited by examiner

*Primary Examiner*—Burton Mullins
(74) *Attorney, Agent, or Firm*—Brundidge & Stanger, P.C.

(57) ABSTRACT

In a power generator provided with a stator frame having a stator iron core incorporating a stator coil therein in an inner portion thereof, and a rotor in which a rotor coil rotating so as to oppose to the stator frame and the stator iron core is incorporated, the power generator is provided with a noise insulation plate fixed to a noise insulation plate attaching seat welded to an outer surface of the stator frame by a bolt and a nut, an elastic body (a gasket) is provided in a contact portion between the noise insulation plate attaching seat and the noise insulation plate, and a vibration-proofing rubber washer is provided in a contact portion between the noise insulation plate and the nut.

11 Claims, 5 Drawing Sheets

ROTARY ELECTRIC MACHINE

BACKGROUND OF THE INVENTION

1. Field of the Invention

The present invention relates to a rotary electric machine, and more particularly to a rotary electric machine which is preferable for a structure employing a noise countermeasure.

2. Description of Related Art

Since the rotary electric machine is generally rotated at a high speed such as 3000 rpm or 3600 rpm, a very loud noise is generated. Accordingly, various artifices are employed as the noise countermeasure.

Particularly, in the case that a noise control is severe, a countermeasure is carried out in such a manner as to surround a whole of the rotary electric machine by a noise insulation enclosure so as to control noise and keep a noise control value in an outer side of the noise insulation enclosure, as described in JP-A-5-219683. Further, as a noise countermeasure against a general noise control, there is a countermeasure that an internal sound is reduced by installing an acoustic absorbent in an inner side of a stator frame so as to intend to reduce the noise, as described in JP-A-11-252850. Further, as the other noise countermeasure, a noise value is reduced by increasing a thickness of the stator frame.

However, if the whole of the rotary electric machine is surrounded by the noise insulation enclosure as mentioned above, there is a problem that a space for installing the noise insulation enclosure is necessary around the rotary electric machine, and a base for installing the noise insulation enclosure is necessary. Since the noise insulation enclosure reduces the noise in an outer portion of the noise insulation enclosure, however, does not reduce the noise in an inner portion of the noise insulation enclosure, it is necessary for an inspection worker to enter into the enclosure, for example, in the case of inspecting the rotary electric machine, and there is a risk that the inspecting worker entering into the noise insulation enclosure is exposed to a loud noise of the rotary electric machine. In addition, within the noise insulation enclosure, since the surface of the stator frame becomes high temperature at a time of operating the rotary electric machine, there is a problem that the temperature within the noise insulation enclosure is increased. Further, since the noise insulation enclosure is sufficiently shielded and sealed for noise insulation, there is a risk that a lack of oxygen is generated. In order to prevent these problems, it is necessary to be provided with a ventilating equipment. Further, a firefighting equipment is necessary within the noise insulation enclosure for safety reasons, and the incidental equipment of the noise insulation enclosure is large scaled.

On the other hand, in the case that an acoustic absorbent is attached to an inner side of the stator frame, the acoustic absorbent becomes fragile due to an aged deterioration of the acoustic absorbent, the acoustic absorbent flies in all directions due to an inside wind generated at a time of operating the rotary electric machine, and there is a risk of affecting a cooling performance of the rotary electric machine. Further, it is necessary to structure such that the acoustic absorbent is fixed to the stator frame for attaching the acoustic absorbent, and there is a problem that the structure of the stator frame is complicated.

Further, in the case that the thickness of the stator frame is made thick, there is a problem that a weight of a power generator is increased by increasing the thickness.

BRIEF SUMMARY OF THE INVENTION

The present invention is made by taking the actual condition mentioned above into consideration, and an object of the present invention is to provide a rotary electric machine which can achieve a low noise by a simple structure even in the case that a noise control value is severe, does not require any additional equipment, and requires only a minimum increase of weight.

In order to achieve the object mentioned above, in accordance with the present invention, there is provided a rotary electric machine comprising:

a stator structured such that a stator coil is incorporated in a stator iron core;

a rotor arranged so as to oppose to the stator and structured such that a rotor coil is incorporated in a rotor iron core;

the stator and the rotor being stored within a stator frame, wherein the rotary electric machine comprises:

an acoustic absorbent arranged on an outer surface of the stator frame;

a noise insulation plate arranged in a divided manner on an outer surface of the acoustic absorbent; and a T-shaped noise insulation plate attaching seat firmly attached to a part of the outer surface of the stator frame, wherein an end portion of the divisionally arranged noise insulation plate is fixed to the T-shaped noise insulation plate attaching seat by a fastening means, an elastic body is arranged between the noise insulation plate attaching seat and the noise insulation plate, and a vibration-proofing means is provided between the noise insulation plate and the fastening means.

Alternatively, the rotary electric machine comprises:

a T-shaped noise insulation plate attaching seat firmly attached to a part of an outer surface of the stator frame, wherein an end portion of the divisionally arranged noise insulation plate is fixed to the T-shaped noise insulation plate attaching seat by a fastening means, an elastic body is arranged between the noise insulation plate attaching seat and the noise insulation plate, and a vibration-proofing means is provided between the noise insulation plate and the fastening means, a space portion is formed between the stator frame and the noise insulation plate, and a pressure of the space portion is set to a negative pressure or an inert gas is filled in the space portion.

In the rotary electric machine in accordance with the present invention, it is preferable that the fastening means is constituted by a bolt passing through the noise insulation plate attaching seat, the elastic body, the noise insulation plate and the vibration-proofing means, and a nut fastening the bolt, a vibration-proofing rubber seat serving as the vibration-proofing means is arranged between the nut and the noise insulation plate, and a gasket serving as the elastic body is arranged between the noise insulation plate attaching seat and the noise insulation plate.

In the rotary electric machine in accordance with the present invention, it is preferable that a space portion is provided between the acoustic absorbent and the stator frame.

In the rotary electric machine in accordance with the present invention, it is preferable that a space portion is provided between the noise insulation plate and the acoustic absorbent.

In the rotary electric machine in accordance with the present invention, it is preferable that a retention bracket holding the acoustic absorbent is arranged in the space portion.

In the rotary electric machine in accordance with the present invention, it is preferable that in the case of setting the space portion under a negative pressure, the pressure is set between $10^{-1}$ torr and $10^{-2}$ torr.

In the rotary electric machine in accordance with the present invention, it is preferable that in the case that the inert gas is filled in the space portion, the inert gas is constituted by a helium or an argon.

In the rotary electric machine in accordance with the present invention, it is preferable that the fastening means is constituted by a stud bolt passing through the noise insulation plate attaching seat, the elastic body, the noise insulation plate and the vibration-proofing means and having one end firmly attached to the stator frame, and a nut fastening the stud bolt, a vibration-proofing rubber seat serving as the vibration-proofing means is arranged between the nut and the noise insulation plate, and a gasket serving as the elastic body is arranged between the noise insulation plate attaching seat and the noise insulation plate.

In accordance with the present invention, it is possible to obtain the rotary electric machine which can achieve a low noise by a simple structure even in the case that the noise control value is severe, does not require any additional equipment, and requires only a minimum increase of weight.

It is possible to achieve the purpose of obtaining the rotary electric machine which can achieve the low noise by the simple structure even in the case that the noise control value is severe, does not require any additional equipment, and requires only the minimum increase of weight, without devising any special means.

Other objects, features and advantages of the invention will become apparent from the following description of the embodiments of the invention taken in conjunction with the accompanying drawings.

DETAILED DESCRIPTION OF THE INVENTION

Embodiment 1

Figure 1:
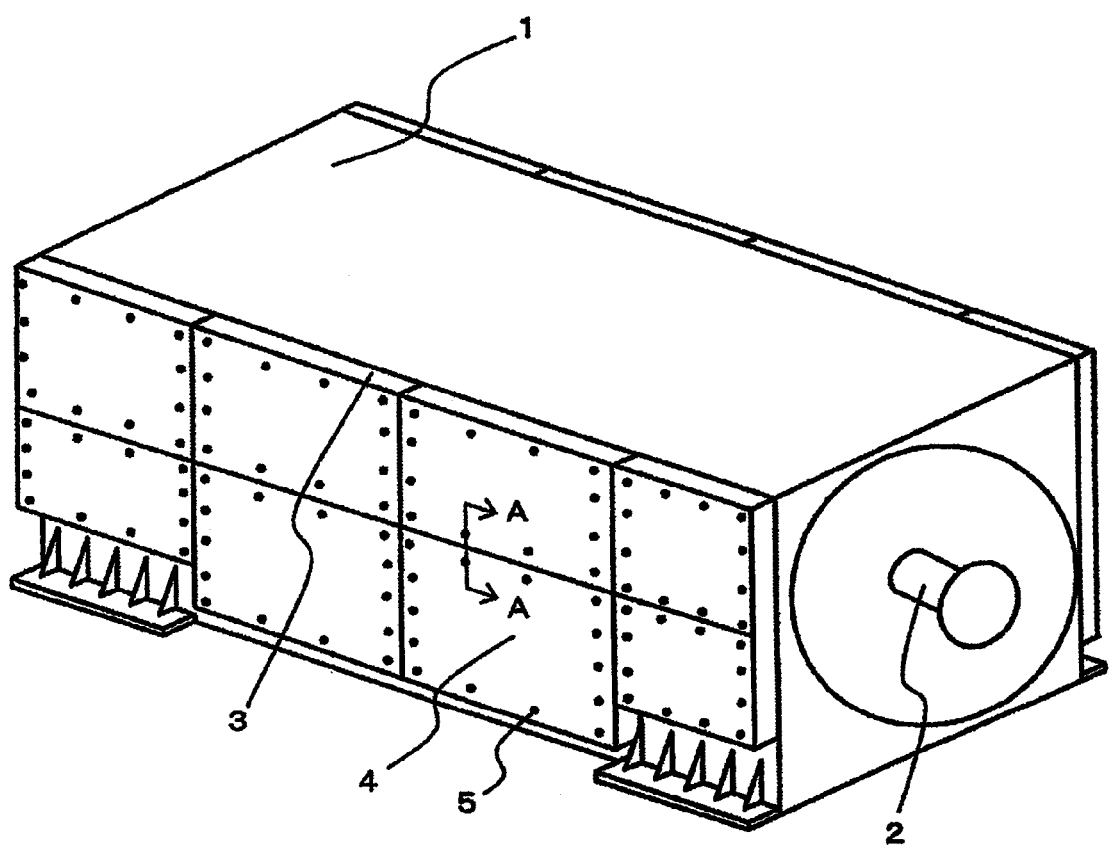
FIG. 1 is a perspective view showing a turbine power generator corresponding to a first embodiment of a rotary electric motor in accordance with the present invention.
Figure 2:
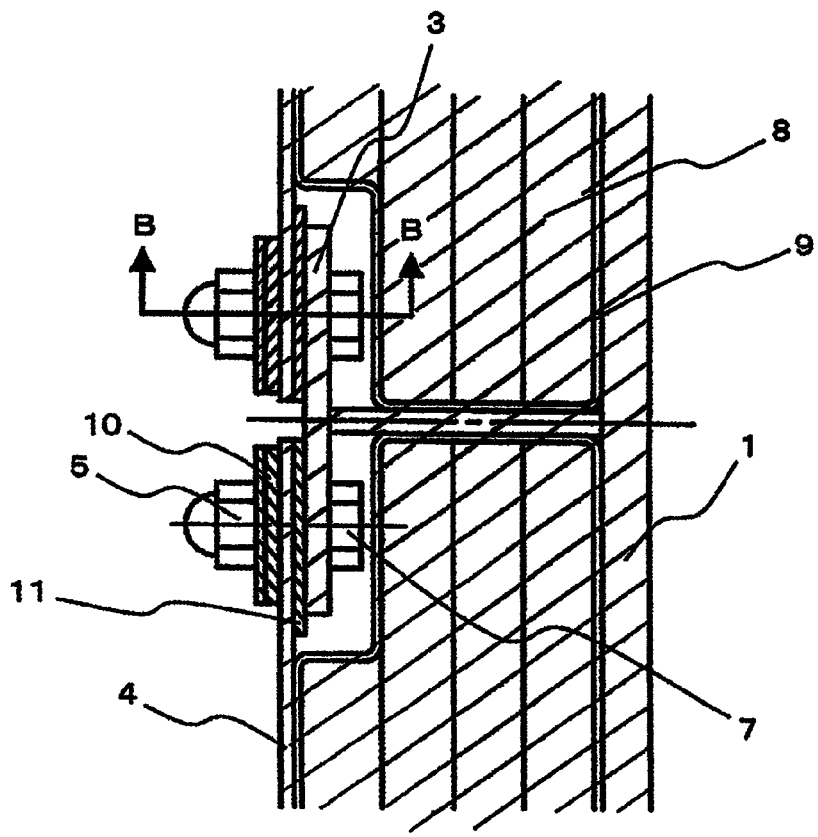
FIG. 2 is a cross sectional view as seen from an arrow A-A in FIG. 1, and shows a connecting structure between a noise insulation plate and a noise insulation plate attaching seat.
Figure 3:
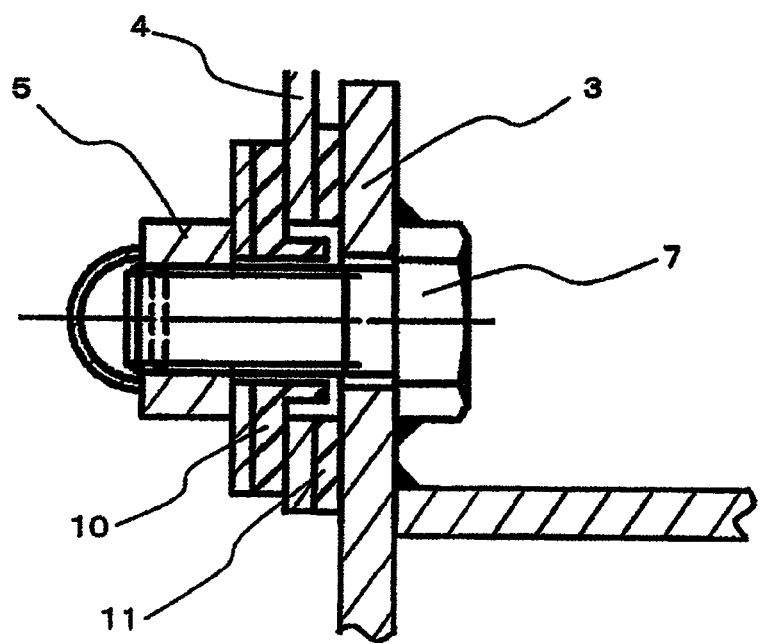
FIG. 3 is a cross sectional view as seen from an arrow B-B in FIG. 2, and shows details of the connecting structure in FIG. 2.

A description will be given of an embodiment in accordance with the present invention with reference to the accompanying drawings. FIG. 1 shows a whole structure of a turbine power generator corresponding to a first embodiment of a rotary electric motor in accordance with the present invention, FIG. 2 is a cross sectional view as seen from an arrow A-A in FIG. 1, and FIG. 3 is a cross sectional view as seen from an arrow B-B in FIG. 2.

In the drawings, reference numeral 1 denotes a stator frame. Within the stator frame 1, there are incorporated a stator structured such that a stator coil is installed in a stator iron core, and a rotor 2 arranged so as to oppose to the stator and structured such that a rotor coil is installed in a rotor iron core.

On the other hand, an acoustic absorbent 8 made of a glass wool surrounded by an acoustic absorbent scattering preventing cover 9 is arranged in an outer surface of the stator frame 1, and a plurality of divided noise insulation plates 4 are arranged in an outer surface of the acoustic absorbent 8. Further, a T-shaped noise insulation plate attaching seat 3 is firmly attached to a part of the outer surface of the stator frame 1 in accordance with a welding, and an end portion of the divisionally arranged noise insulation plate 4 is fixed to the T-shaped noise insulation plate attaching seat 3 by a fastening means constituted by a bolt 7 and a nut 5. Further, a gasket 11 corresponding to an elastic body is arranged between the noise insulation plate attaching seat 3 and the noise insulation plate 4, and a vibration-proofing rubber washer 10 serving as the vibration-proofing means having a function of preventing a vibration from being propagated is arranged between the noise insulation plate 4 and the nut 5.

In other words, in the present embodiment, the bolt 7 passes through the noise insulation plate attaching seat 3, the gasket 11, the noise insulation plate 4 and the vibration-proofing rubber washer 10, and the bolt 7 is fastened by the nut 5. However, at this time, the vibration-proofing rubber washer 10 is arranged between the nut 5 and the noise insulation plate 4, and the gasket 11 is arranged between the noise insulation plate attaching seat 3 and the noise insulation plate 4 so as to be fastened.

In accordance with the first embodiment having the structure mentioned above, it is possible to prevent the vibration from being propagated from the stator frame 1 to the noise insulation plate 4 together with the noise, and it is possible to achieve an effective sound insulation. In other words, in the present embodiment, since the stator frame 1, the noise insulation plate attaching seat 3 and the noise insulation plate 4 come into contact with the gasket 11 serving as the elastic body only via the vibration-proofing rubber washer 10, it is possible to reduce a solid propagation sound from the stator frame 1 or the noise insulation plate attaching plate 3 to the noise insulation plate 4. Accordingly, the effective sound insulation can be achieved without such a countermeasure as an installation of the noise insulation enclosure, an installation of the acoustic absorbent in an inner side of the stator frame 1, and an increase of thickness of the stator frame 1.

In this case, as a material having a function of preventing the vibration from being propagated and a sealing function, there can be considered a rubber, a gasket and the like in addition to the vibration-proofing rubber. Further, as the acoustic absorbent 8, there can be considered a rock wool and a sponge in addition to the glass wool.

Embodiment 2

Figure 4:
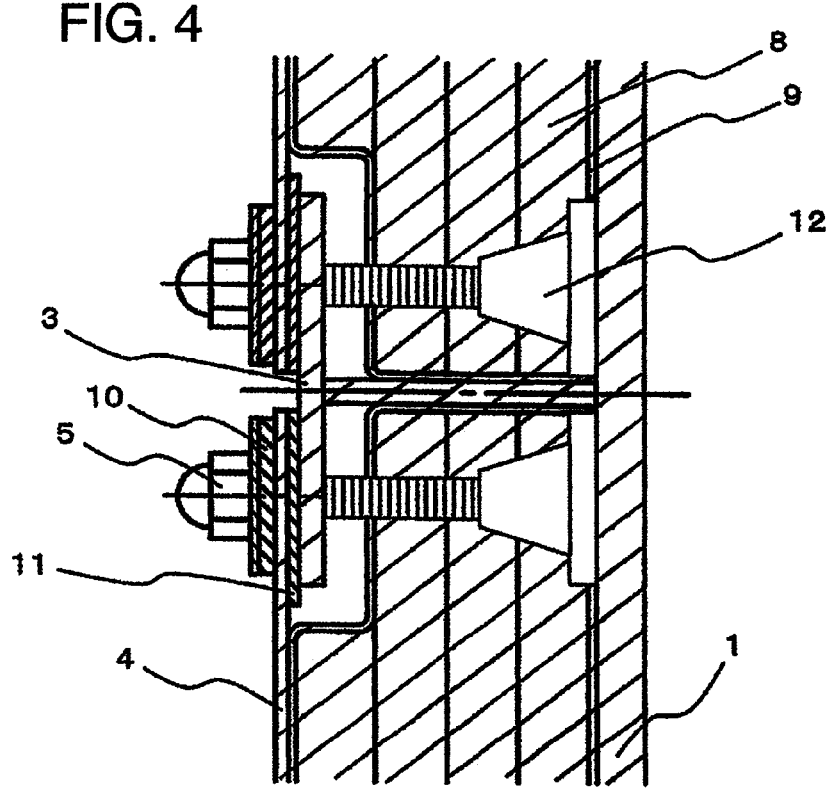
FIG. 4 shows a turbine power generator corresponding to a second embodiment of a rotary electric motor in accordance with the present invention, and is a view corresponding to FIG. 2.

FIG. 4 shows a second embodiment of a turbine power generator corresponding to a rotary electric machine in accordance with the present invention, and corresponds to a modified embodiment of the first embodiment mentioned above.

The second embodiment is different from the first embodiment mentioned above in a point that there is employed a stud bolt 12 in which one end portion is firmly attached to the stator frame 1, and the other end passes through the noise insulation plate attaching seat 3, the gasket 11, the noise insulation plate 4 and the vibration-proofing rubber washer 10, and the other end portion of the stud bolt 12 is fastened by the nut 5. The vibration-proofing rubber washer 10 is arranged between the nut 5 and the noise insulation plate 4, and the gasket 11 is arranged between the noise insulation plate attaching seat 3 and the noise insulation plate 4. The other structures are the same as the first embodiment mentioned above.

In accordance with the second embodiment mentioned above, since its effect is the same as the first embodiment mentioned above, however, the noise insulation plate attaching seat 3 is more firmly fixed by the stud bolt 12, the propagation of the vibration from the stator frame 1 to the noise insulation plate 4 can be more securely prevented in comparison with the first embodiment, and it is possible to achieve an effective sound insulation.

Embodiment 3

Figure 5:
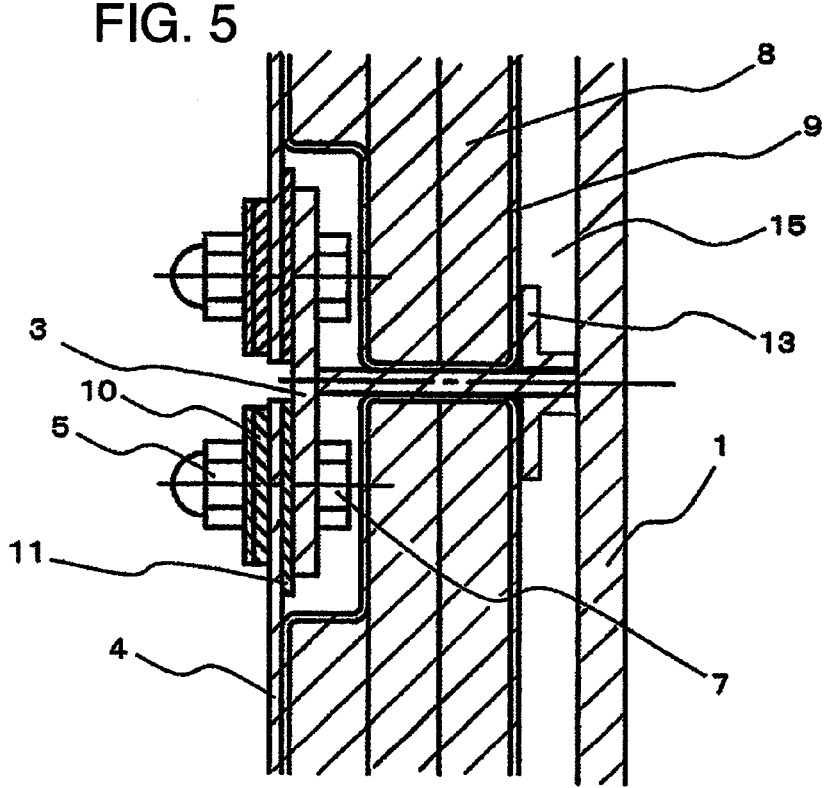
FIG. 5 shows a turbine power generator corresponding to a third embodiment of a rotary electric motor in accordance with the present invention, and is a view corresponding to FIG. 2.

FIG. 5 shows a third embodiment of a turbine power generator corresponding to a rotary electric machine in accordance with the present invention, and corresponds to a modified embodiment of the first embodiment mentioned above.

The third embodiment is different from the first embodiment mentioned above in a point that a space portion 15 is formed between the stator frame 1 and the acoustic absorbent 8 surrounded by the acoustic absorbent scattering preventing cover 9, and an acoustic absorbent retention bracket 13 holding the acoustic absorbent 8 is arranged in the space portion 15. The acoustic absorbent retention bracket 13 is supported to the T-shaped noise insulation plate attaching seat 3 around the noise insulation plate attaching seat 3 serving as a center axis, and supports the acoustic absorbent 8 surrounded by the acoustic absorbent scattering preventing cover 9 by a flat portion formed approximately as a T-shaped form. The other structures are the same as the first embodiment mentioned above.

In accordance with the third embodiment mentioned above, since its effect is the same as the first embodiment mentioned above. However, the present embodiment pays attention to the fact that an amount of sound insulation and an insulated sound frequency characteristic are changed in accordance with a distance from the stator frame 1 to the acoustic absorbent 8, and can adjust the amount of sound insulation and the insulated sound frequency by setting the space portion 15 having an optional distance between the stator frame 1 and the acoustic absorbent 8. Further, since the stator frame 1, the noise insulation plate attaching seat 3 and the noise insulation plate 4 are in contact via only the vibration-proofing rubber washer 10 and the elastic body of the gasket 11, the propagation of the vibration to the noise insulation plate 4 can be prevented, and it is possible to achieve an effective sound insulation.

Embodiment 4

Figure 6:
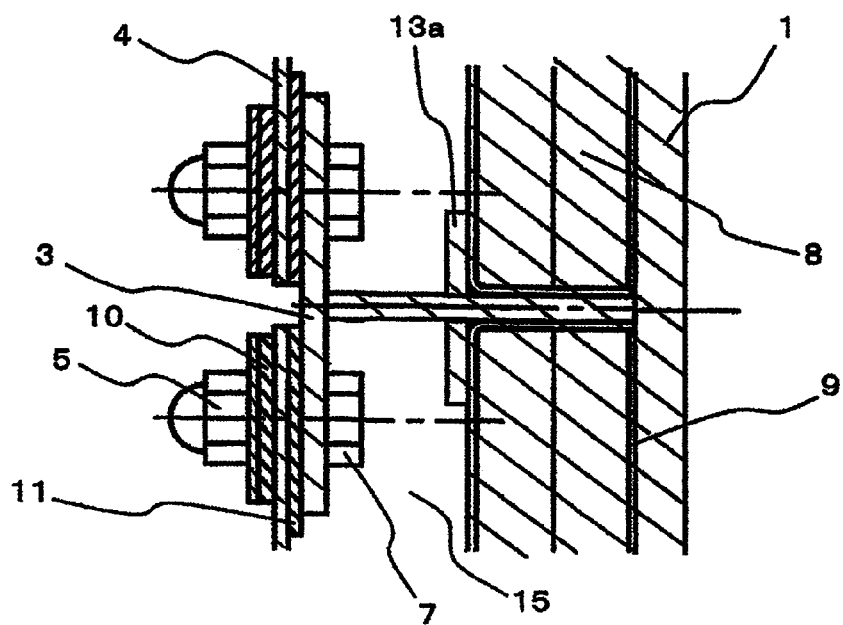
FIG. 6 shows a turbine power generator corresponding to a fourth embodiment of a rotary electric motor in accordance with the present invention, and is a view corresponding to FIG. 2.

FIG. 6 shows a fourth embodiment of a turbine power generator corresponding to a rotary electric machine in accordance with the present invention, and corresponds to a modified embodiment of the third embodiment mentioned above.

The fourth embodiment is different from the third embodiment mentioned above in the following point. In other words, in the third embodiment, the space portion 15 is formed between the stator frame 1 and the acoustic absorbent 8 surrounded by the acoustic absorbent scattering preventing cover 9. On the other hand, in the fourth embodiment, the space portion 15 is formed between the noise insulation plate 4 and the acoustic absorbent 8, an acoustic absorbent retention bracket 13*a* holding the acoustic absorbent 8 surrounded by the acoustic absorbent scattering preventing cover 9 supported by the T-shaped noise insulation attaching seat 3 is arranged in the space portion 15 between the noise insulation plate 4 and the acoustic absorbent 8, and the space portion 15 is not force between the stator frame 1 and the acoustic absorbent 8 surrounded by the acoustic absorbent scattering preventing cover 9.

In accordance with the fourth embodiment mentioned above, its effect is the same as the first embodiment mentioned above, however, the present embodiment pays attention to the fact that the amount of sound insulation and the frequency of the insulated sound are changed in accordance with a distance from the acoustic absorbent 8 and the noise insulation plate 4, and can adjust the amount of sound insulation and the insulated sound frequency to be insulated by setting a space portion 15*a* having an optional distance between the acoustic absorbent 8 and the noise insulation plate 4, and determining the distance between the noise insulation plate 4 and the acoustic absorbent 8 in such a manner that the amount of sound insulation and the insulated sound frequency come to preferable values. Further, since the stator frame 1, the noise insulation plate attaching seat 3 and the noise insulation plate 4 are in contact via only the vibration-proofing rubber washer 10 and the elastic body of the gasket 11, the propagation of the vibration to the noise insulation plate 4 can be prevented, and it is possible to achieve an effective sound insulation.

Embodiment 5

Figure 7:
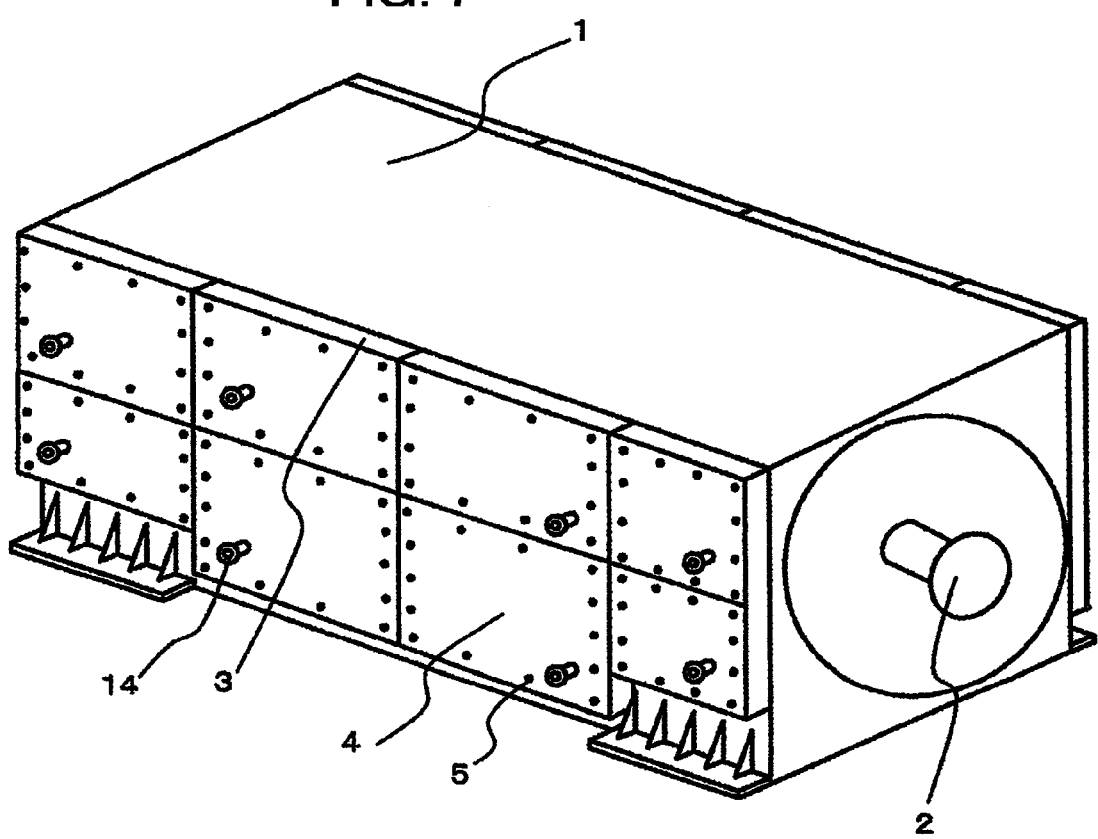
FIG. 7 is a perspective view showing a turbine power generator corresponding to a fifth embodiment of a rotary electric motor in accordance with the present invention.
Figure 8:
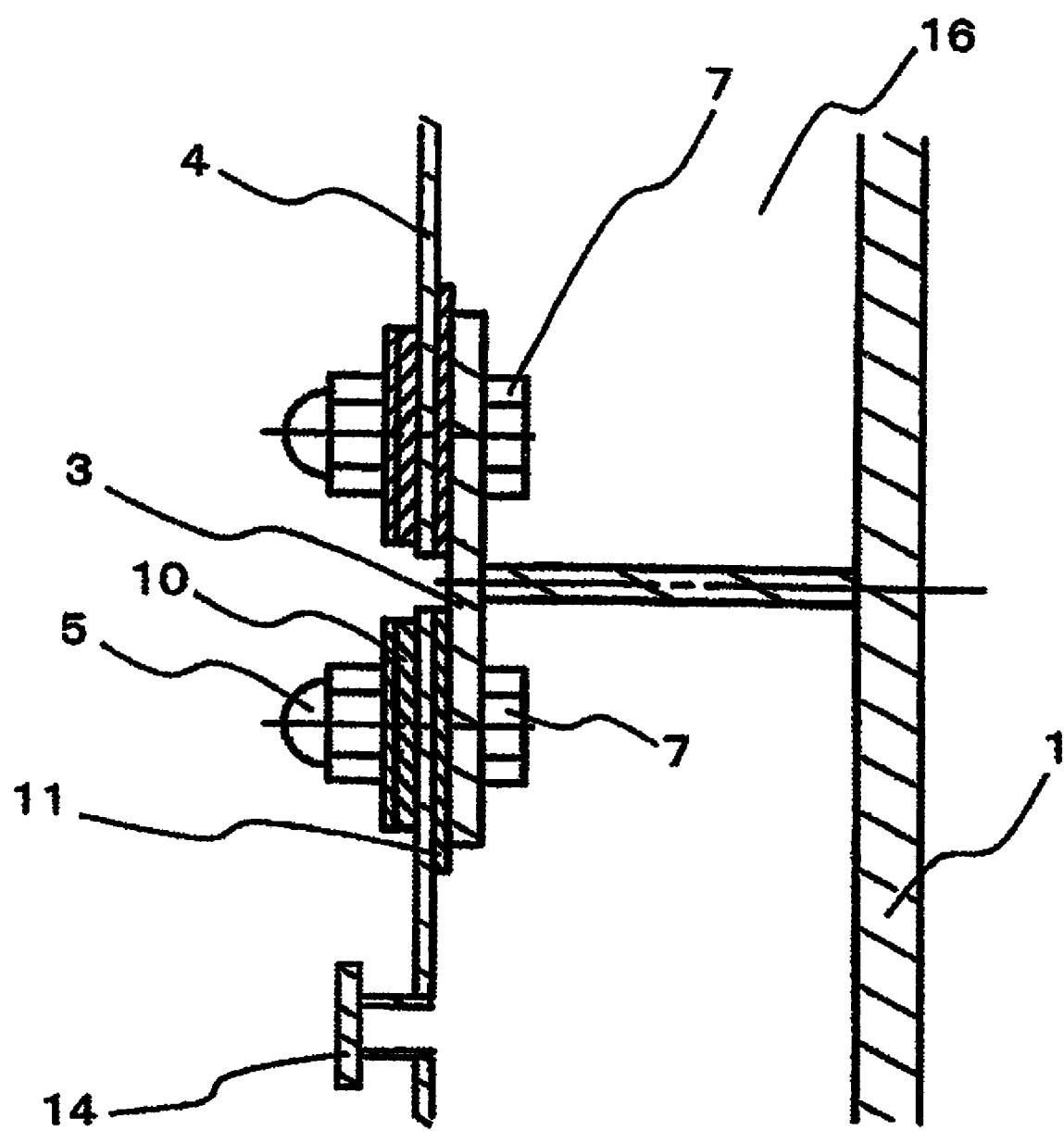
FIG. 8 is a cross sectional view showing a connecting structure between a noise insulation plate and a noise insulation plate attaching seat of a turbine power generator corresponding to a fifth embodiment of a rotary electric machine in accordance with the present invention.

FIGS. 7 and 8 show a fifth embodiment of a turbine power generator corresponding to a rotary electric machine in accordance with the present invention, and corresponds to a modified embodiment of the first embodiment mentioned above. FIG. 7 shows a whole structure of the turbine power generator, and FIG. 8 shows a cross sectional structure of the noise insulation plate and the noise insulation plate attaching seat.

In the present embodiment shown in the drawings, reference numeral 1 denotes the stator frame. Within the stator frame 1, there are incorporated the stator structured such that the stator coil is installed in the stator iron core, and the rotor 2 arranged so as to oppose to the stator and structured such that the rotor coil is installed in the rotor iron core.

Further, in the present embodiment, the acoustic absorbent made of the glass wool surrounded by the acoustic absorbent scattering preventing cover is not arranged in the outer surface of the stator frame 1, and a plurality of divided noise insulation plates 4 are not arranged in the outer surface of the acoustic absorbent as is different from the first embodiment, but a space portion 16 is formed between the stator frame 1 and the noise insulation plate 4, the T-shaped noise insulation plate attaching seat 3 firmly attached to a part of the outer surface of the stator frame 1 in accordance with the welding is arranged within the space portion 16, and the end portion of the divisionally arranged noise insulation plate 4 is fixed to the T-shaped noise insulation plate attaching seat 3 by the fastening means constituted by the bolt 7 and the nut 5.

Further, in the present embodiment, a pressure of the space portion 16 is set to a negative pressure, for example, $10^{-1}$ torr to $10^{-2}$ torr.

Further, the gasket 11 serving as the elastic body is arranged between the noise insulation plate attaching seat 3 and the noise insulation plate 4, and the vibration-proofing rubber washer 10 serving as the vibration-proofing means having the function of preventing the propagation of the vibration is arranged between the noise insulation plate 4 and the nut 5. The bolt 7 passes through the noise insulation plate attaching seat 3, the gasket 11, the noise insulation plate 4, and the vibration-proofing rubber washer 10, and the bolt 7 is fastened by the nut 5. However, at this time, the vibration-proofing rubber washer 10 is arranged between the nut 5 and the noise insulation plate 4, and the gasket 11 is arranged between the noise insulation plate attaching seat 3 and the noise insulation plate 4 so as to be fastened. In this case, reference numeral 14 denotes a flange communicating with the space portion 16 for making the space portion 16 in a negative pressure state.

In accordance with the fourth embodiment mentioned above, its effect is the same as the first embodiment mentioned above, however, the present embodiment pays attention to the fact that the amount of sound insulation is different in correspondence to a pressure state between the stator frame 1 and the noise insulation plate 4, and increases the amount of sound insulation by setting the space portion 16 between the stator frame 1 and the noise insulation plate 4 to $10^{-1}$ torr to $10^{-2}$ torr. Further, since the stator frame 1, the noise insulation plate attaching seat 3 and the noise insulation plate 4 are in contact via only the vibration-proofing rubber washer 10 and the elastic body of the gasket 11, the propagation of the vibration to the noise insulation plate 4 can be prevented, and it is possible to achieve an effective sound insulation.

Embodiment 6

A sixth embodiment is structured such that an inert gas such as a helium, an argon or the like is filled in the space portion between the stator frame 1 and the noise insulation plate 4 described in the fifth embodiment.

In accordance with the structure mentioned above, since the amount of sound insulation is increased by the inert gas such as the helium, the argon or the like, and the stator frame 1, the noise insulation plate attaching seat 3 and the noise insulation plate 4 are in contact via only the vibration-proofing rubber washer 10 and the elastic body of the gasket 11, the propagation of the vibration to the noise insulation plate 4 can be prevented, and it is possible to achieve an effective sound insulation.

The rotary electric machine in accordance with the present invention can achieve the low noise by the simple structure even in the case that the noise control value is severe, does not require any additional means such as the noise insulation enclosure surrounding the periphery of the rotary electric machine, the acoustic absorbent in the inner side of the stationary frame, the increase of thickness of the stator frame and the like, for the noise insulation.

In this case, in the present invention, the description is given by exemplifying the power generator as the rotary electric machine, however, the present invention can be widely applied to an electric motor or the other rotary electric machines.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotary electric machine comprising:
    a stator structured such that a stator coil is incorporated in a stator iron core;
    a rotor arranged so as to oppose to said stator and structured such that a rotor coil is incorporated in a rotor iron core;
    the stator and the rotor being stored within a stator frame,
    wherein the rotary electric machine comprises:
    an acoustic absorbent arranged on an outer surface of said stator frame;
    a noise insulation plate arranged in a divided manner on an outer surface of said acoustic absorbent; and
    a T-shaped noise insulation plate attaching seat firmly attached to a part of the outer surface of said stator frame, and
    wherein an end portion of said divisionally arranged noise insulation plate is fixed to said T-shaped noise insulation plate attaching seat by a fastening means, and an elastic body is arranged between said T-shaped noise insulation plate attaching seat and said noise insulation plate.

2. A rotary electric machine as claimed in claim 1, wherein a space portion is provided between said acoustic absorbent and said stator frame.

3. A rotary electric machine as claimed in claim 2, wherein a retention bracket holding said acoustic absorbent is arranged in said space portion.

4. A rotary electric machine as claimed in claim 1, wherein a space portion is provided between said noise insulation plate and said acoustic absorbent.

5. A rotary electric machine as claimed in claim 1, wherein a vibration-proofing means is provided between said noise insulation plate and said fastening means.

6. A rotary electric machine as claimed in claim 5, wherein said fastening means is constituted by a stud bolt passing through said T-shaped noise insulation plate attaching seat, the elastic body, the noise insulation plate and the vibration-proofing means and having one end firmly attached to said stator frame, and a nut fastening said stud bolt, a vibration-proofing rubber washer serving as said vibration-proofing means is arranged between said nut and said noise insulation plate, and a gasket serving as said elastic body is arranged between said T-shaped noise insulation plate attaching seat and said noise insulation plate.

7. A rotary electric machine as claimed in claim 5, wherein said fastening means is constituted by a bolt passing through said T-shaped noise insulation plate attaching seat, the elastic body, the noise insulation plate and the vibration-proofing means, and a nut fastening said bolt, a vibration-proofing rubber washer serving as said vibration-proofing means is arranged between said nut and said noise insulation plate, and a gasket serving as said elastic body is arranged between said T-shaped noise insulation plate attaching seat and said noise insulation plate.

8. A rotary electric machine comprising:
    a stator structured such that a stator coil is incorporated in a stator iron core;
    a rotor arranged so as to oppose to said stator and structured such that a rotor coil is incorporated in a rotor iron core;
    the stator and the rotor being stored within a stator frame,
    wherein the rotary electric machine comprises:

a T-shaped noise insulation plate attaching seat firmly attached to a part of an outer surface of said stator frame, and wherein an end portion of said divisionally arranged noise insulation plate is fixed to said T-shaped noise insulation plate attaching seat by a fastening means, an elastic body is arranged between said T-shaped noise insulation plate attaching seat and said noise insulation plate, a space portion is formed between said stator frame and said noise insulation plate, and a pressure of the space portion is set to a negative pressure or an inert gas is filled in the space portion.

9. A rotary electric machine as claimed in claim 8, wherein in the case of setting said space portion under a negative pressure, the pressure is set between $10^{-1}$ torr and $10^{-2}$ torr.

10. A rotary electric machine as claimed in claim 8, wherein in the case that the inert gas is filled in said space portion, the inert gas is constituted by a helium or an argon.

11. A rotary electric machine as claimed in claim 8, wherein a vibration-proofing means is provided between said noise insulation plate and said fastening means.

\* \* \* \* \*